(12) United States Patent
Nelson et al.

(10) Patent No.: US 8,610,044 B2
(45) Date of Patent: Dec. 17, 2013

(54) METHOD FOR PRODUCING A LINEAR IMAGE SENSOR HAVING MULTIPLE OUTPUTS

(75) Inventors: Edward T. Nelson, Pittsford, NY (US); Shen Wang, Pittsford, NY (US)

(73) Assignee: Truesence Imaging, Inc., Rochester, NY (US)

( * ) Notice: Subject to any disclaimer, the term of this patent is extended or adjusted under 35 U.S.C. 154(b) by 353 days.

(21) Appl. No.: 12/971,743

(22) Filed: Dec. 17, 2010

(65) Prior Publication Data

US 2012/0153133 A1    Jun. 21, 2012

(51) Int. Cl.
*G01J 1/44*    (2006.01)

(52) U.S. Cl.
USPC ............ 250/214 P; 250/214.1; 348/303

(58) Field of Classification Search
USPC ............ 348/294–323; 250/214.1, 214 R
See application file for complete search history.

(56) References Cited

U.S. PATENT DOCUMENTS

| | | | |
|---|---|---|---|
| 5,400,071 | A | 3/1995 | Yamada |
| 6,803,960 | B2 | 10/2004 | Shepherd et al. |
| 2002/0051068 | A1 | 5/2002 | Murayama et al. |
| 2002/0097331 | A1 | 7/2002 | Yamada et al. |
| 2002/0100886 | A1 | 8/2002 | Yasuda et al. |
| 2003/0030736 | A1 | 2/2003 | Yoshihara et al. |
| 2005/0012841 | A1 | 1/2005 | Yoshizawa |
| 2007/0285518 | A1* | 12/2007 | Ikeda .............. 348/207.99 |
| 2012/0081590 | A1 | 4/2012 | Nelson et al. |
| 2012/0081591 | A1 | 4/2012 | Nelson et al. |

FOREIGN PATENT DOCUMENTS

JP    59075772 A    4/1984

OTHER PUBLICATIONS

International Search Report and Written Opinion issued Dec. 15, 2011 for International Application No. PCT/US2011/051715, 11 pages.

* cited by examiner

*Primary Examiner* — Tony Ko
(74) *Attorney, Agent, or Firm* — Howard & Howard Attorneys PLLC (57) ABSTRACT

A Charge-Coupled Device (CCD) image sensor includes a linear array of photodetectors. The photodetectors in the linear array are arranged into distinct sub-arrays with each sub-array including two or more photodetectors. An output channel is connected to each sub-array of photodetectors. Each output channel includes a horizontal CCD shift register and an output structure connected to an end of the horizontal CCD shift register in a linear arrangement with respect to each other. Each successive output channel is disposed on an alternate side of the linear array. Every other output channel is disposed on an alternate side of the linear array. One or more dark reference pixels can be connected to one or more additional shift register elements in the horizontal CCD shift registers.

9 Claims, 8 Drawing Sheets

METHOD FOR PRODUCING A LINEAR IMAGE SENSOR HAVING MULTIPLE OUTPUTS

TECHNICAL FIELD

The present invention relates to image sensors for use in digital cameras and other types of image capture devices, and more particularly to linear Charge-Coupled Device (CCD) image sensors.

BACKGROUND

Figure 1:
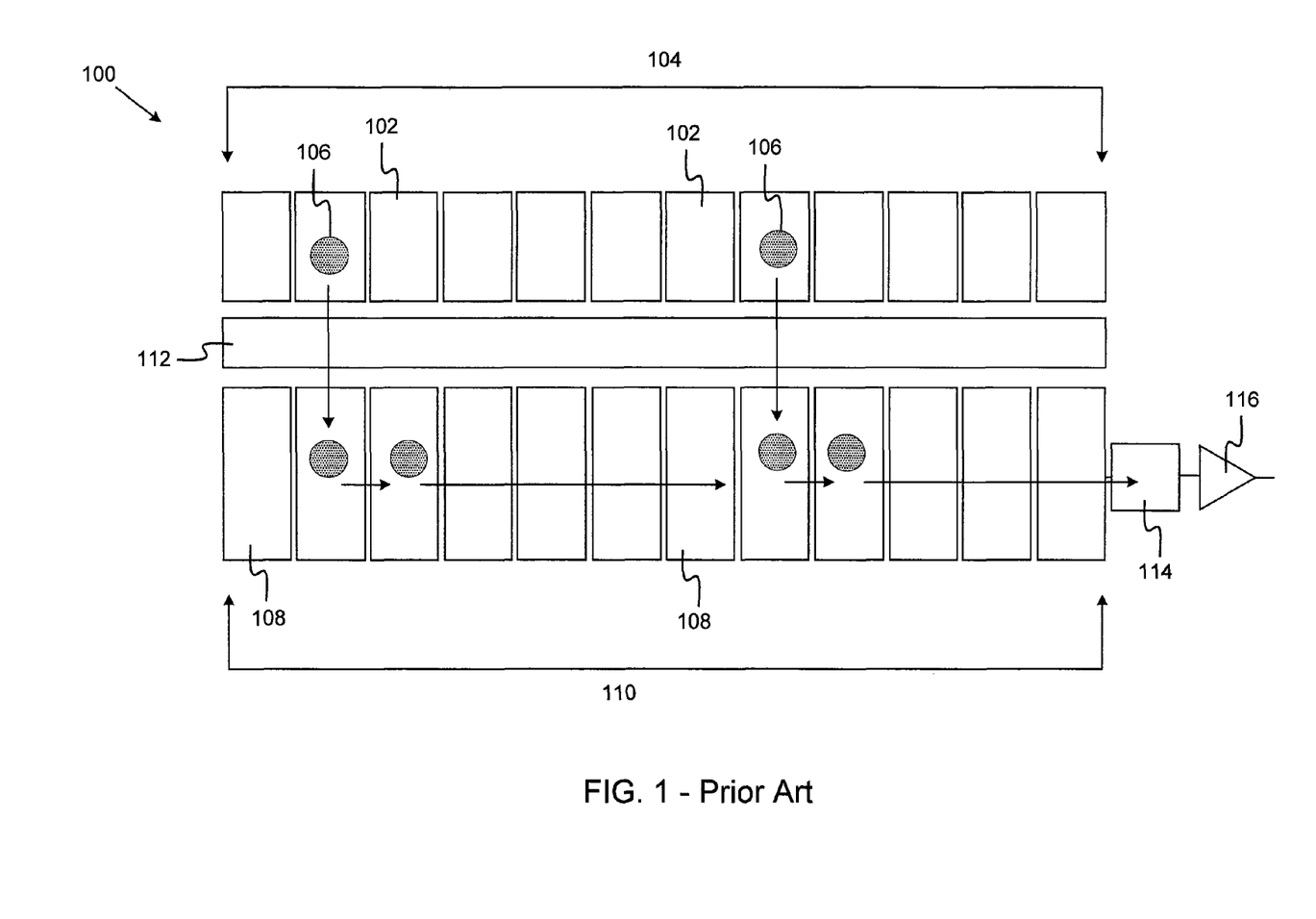
FIG. 1 depicts a simplified block diagram of a single output linear array CCD image sensor in accordance with the prior art.

FIG. 1 depicts a simplified block diagram of a prior art single output linear array CCD image sensor. Image sensor 100 includes a single linear row of photodetectors 102, also known as a linear array 104. Light is converted to photo-carriers (i.e., electrons or holes) by the photodetectors 102. The photo-carriers are subsequently simultaneously transferred, as discrete charge packets 106, to shift register elements 108 in horizontal CCD shift register 110 using transfer mechanism 112. The charge packets 106 are then serially transferred or shifted to charge sensing node 114 by electrically clocking the shift register elements 108. Charge sensing node 114 typically includes a floating diffusion (not shown) that is connected to output buffer 116.

With a single output linear image sensor, charge sensing node 114 and output buffer 116 are located directly at the end of horizontal CCD shift register 110. This placement allows an un-impeded transfer of charge to charge sensing node 114 and output buffer 116. The direction of charge transfer is substantially linear through horizontal CCD shift register 110, charge sensing node 114, and output buffer 116. There is no spatial interference between horizontal CCD shift register 110 and charge sensing node 114 and output buffer 116, allowing the design of each to be optimized for speed and signal quality.

Figure 2:
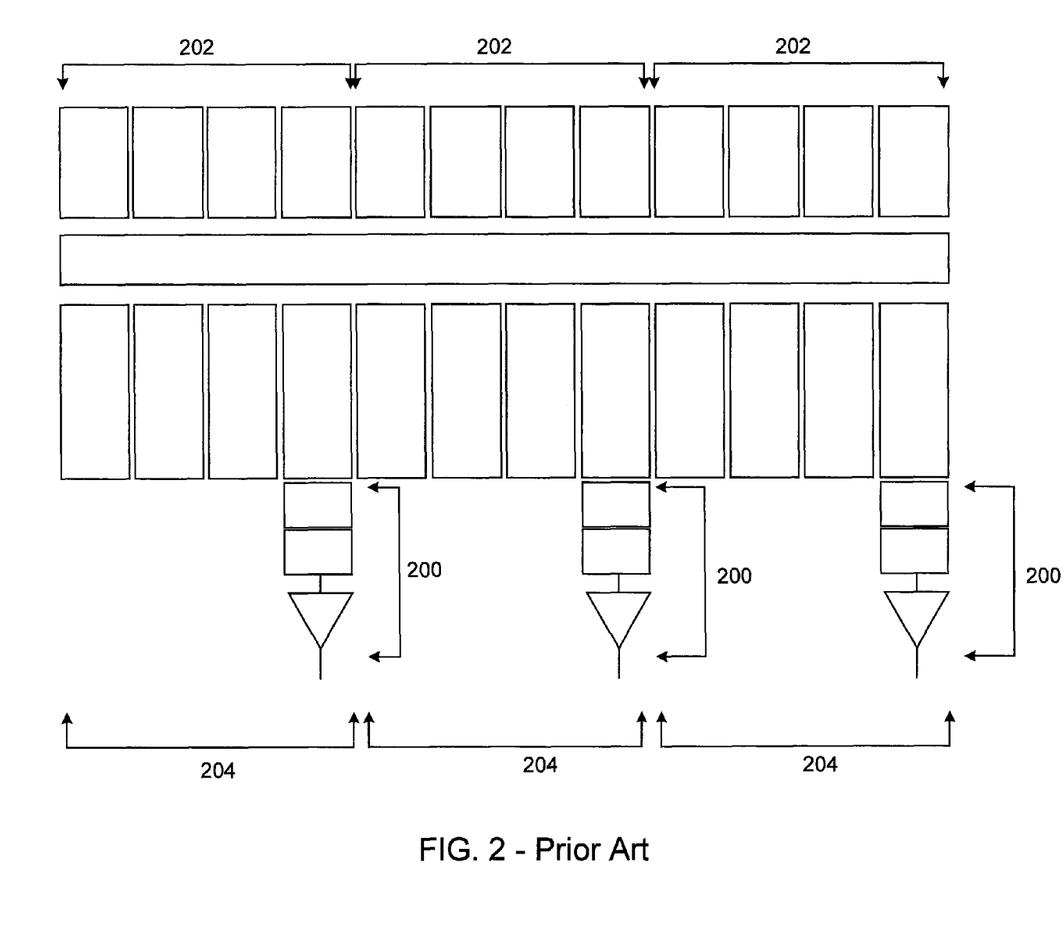
FIG. 2 illustrates a simplified block diagram of a multiple output linear array CCD image sensor in accordance with the prior art.

The operating speed of a linear array CCD image sensor is expressed as lines read out per second. The operating speed is typically increased by using multiple outputs. FIG. 2 illustrates a simplified block diagram of a multiple output linear array CCD image sensor in accordance with the prior art. Each output structure 200 is connected to, and senses the signal from a sub-array 202 of photodetectors, and is located at the end of each horizontal CCD shift register 204.

The problem with conventional multiple output linear image sensors is that the output structures cannot be located in close proximity to the end of each horizontal CCD shift register. The direction of charge transfer is interrupted and not linear through horizontal CCD shift register 110, charge sensing node 114, and output buffer 116. This is because the size of the output structure is much larger than the pitch of the photodetectors. And the photodetectors must be arranged in an un-interrupted array. Thus, there is a physical interference between the output structures and regular pattern of the photodetectors and horizontal CCD shift registers.

Figure 3:
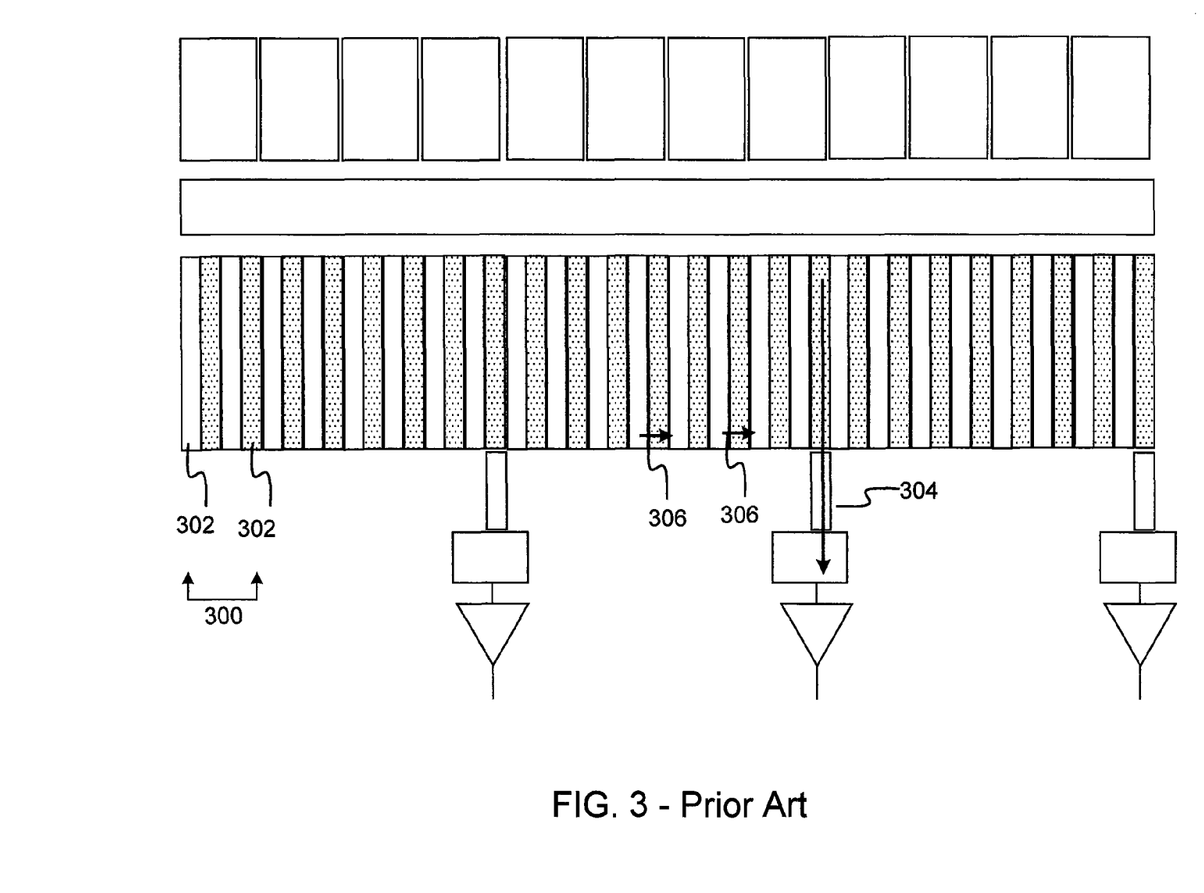
FIG. 3 depicts a simplified block diagram of a multiple output linear array CCD image sensor with a four-phase horizontal CCD shift register in accordance with the prior art.

In the illustrated embodiment of FIGS. 2 and 3, it is necessary to re-direct the transfer of charge through turns or additional shift register elements that interfere in the charge transfer process. These turns increase the distance that the charge must be transferred to reach the output structure, as shown by the arrows in FIG. 3. Each shift register element 300 includes four phases 302 and charge transfer is between each phase in the FIG. 3 embodiment. The charge transfer distance 304 from the last phase to the output is much larger than the charge transfer distance 306 between the phases of the horizontal CCD shift register. The longer charge transfer distance 304 results in a reduced electric field to shift charge. The smaller electric field in turn causes charge transfer inefficiency or the incomplete transfer of charge to the output structure. Additionally, the smaller electric field produces a distortion of the output by mixing the signals of adjacent pixels together. This transfer inefficiency can also result in a loss of part of the signal for the first pixel of each sub-array output structure.

SUMMARY

A Charge-Coupled Device (CCD) image sensor includes a linear array of photodetectors. The photodetectors in the linear array are arranged into distinct sub-arrays with each sub-array including two or more photodetectors. An output channel is connected to each sub-array of photodetectors. Each output channel includes a horizontal CCD shift register and an output structure connected to an end of the horizontal CCD shift register in a linear arrangement with respect to each other such that a path of charge transfer through the horizontal shift register and the output structure is un-interrupted and linear or substantially linear. Each successive output channel, or every other output channel, is disposed on an alternate side of the linear array. One or more dark reference pixels can be connected to one or more additional shift register elements in the horizontal CCD shift registers.

A method for producing multiple outputs for a linear array image sensor includes providing one or more output channels on one side of a linear array of photodetectors, where the output channels are each connected to a distinct sub-array of photodetectors in the linear array. One or more output channels are provided on the other side of the linear array of photodetectors, where the output channels are each connected to a distinct sub-array of photodetectors in the linear array of photodetectors. Each successive output channel, or every other output channel, is provided on an alternate side of the linear array. Each output channel includes a horizontal shift register and an output structure connected to an end of the horizontal shift register in a linear arrangement such that a path of charge transfer through the horizontal shift register and the output structure is un-interrupted and linear or substantially linear. A transfer mechanism is provided between the horizontal shift registers and respective sub-arrays of photodetectors. One or more additional shift register elements can be provided in at least one horizontal shift register. A dark reference pixel can be provided and electrically connected to each additional shift register element.

BRIEF DESCRIPTION OF THE FIGURES

Embodiments of the invention are better understood with reference to the following drawings. The elements of the drawings are not necessarily to scale relative to each other.

DETAILED DESCRIPTION

Throughout the specification and claims the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected or an indirect connection through one or more passive or active intermediary devices. The term "circuit" means either a single component or a multiplicity of components, either active or passive, that are connected together to provide a desired function. The term "signal" means at least one current, voltage, or data signal.

Additionally, directional terms such as "on", "over", "top", "bottom", "left", "right", are used with reference to the orientation of the Figure(s) being described. Because components of embodiments of the present invention can be positioned in a number of different orientations, the directional terminology is used for purposes of illustration only and is in no way limiting. When used in conjunction with layers of an image sensor wafer or corresponding image sensor, the directional terminology is intended to be construed broadly, and therefore should not be interpreted to preclude the presence of one or more intervening layers or other intervening image sensor features or elements. Thus, a given layer that is described herein as being formed on or formed over another layer may be separated from the latter layer by one or more additional layers. When used in conjunction with the construction or operation of an image sensor, the directional terminology is intended to be construed broadly, and therefore should not be interpreted to preclude alternate constructions or operations.

Referring to the drawings, like numbers indicate like parts throughout the views.

Figure 4:
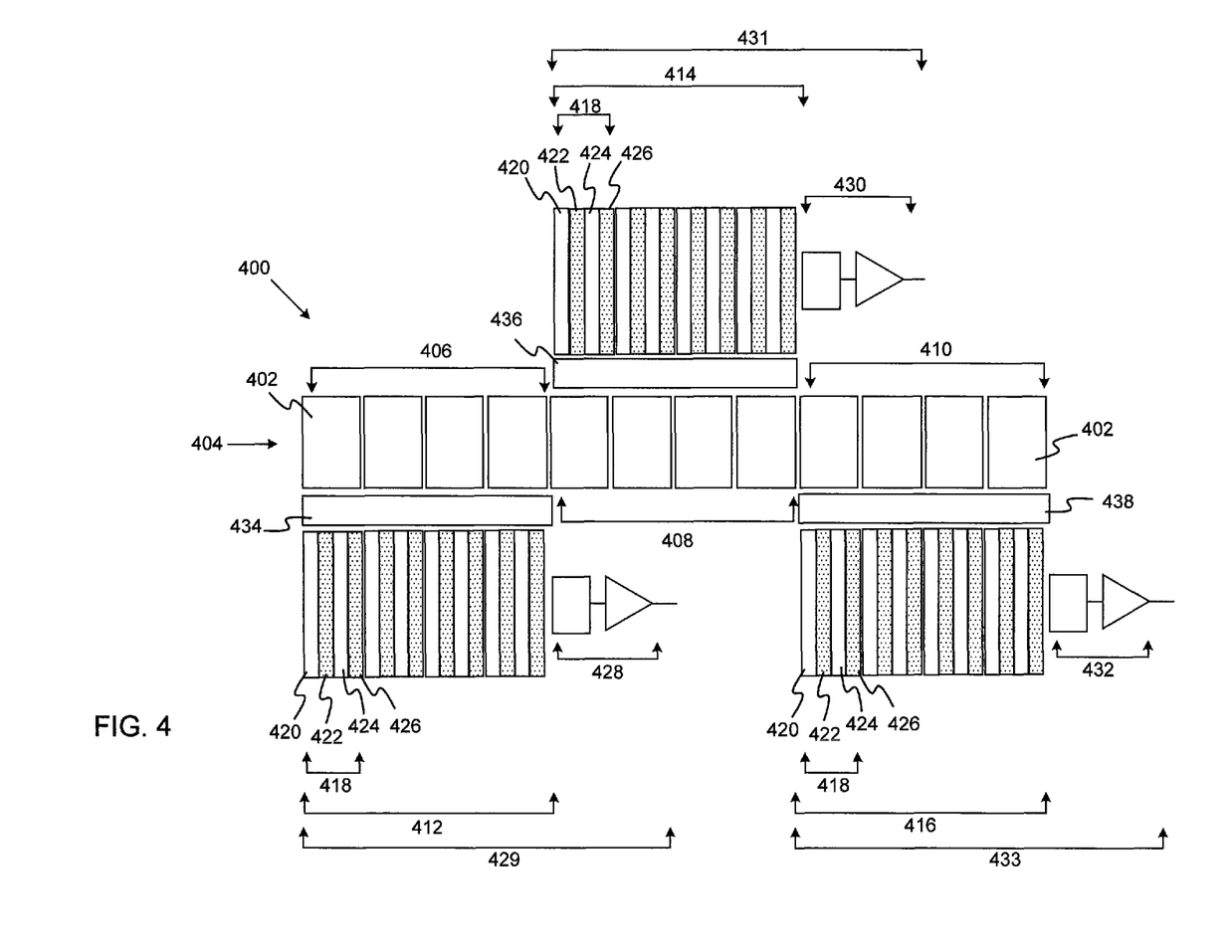
FIG. 4 illustrates a simplified block diagram of a multiple output linear array CCD image sensor in a first embodiment in accordance with the invention.

FIG. 4 illustrates a simplified block diagram of a multiple output linear array CCD image sensor in a first embodiment in accordance with the invention. Image sensor 400 includes multiple photodetectors 402 arranged in a linear array 404. For simplicity, only twelve photodetectors 402 are shown. Those skilled in the art will recognize a linear array can include any number of photodetectors.

Contiguous photodetectors 402 are grouped into distinct sub-arrays 406, 408, 410. Each sub-array 406, 408, 410 includes two or more photodetectors 402 in an embodiment in accordance with the invention. Horizontal CCD shift registers 412, 414, 416 include multiple shift register elements 418 having one or more phases per photodetector. In the illustrated embodiment, each shift register element 418 has four phases 420, 422, 424, 426 for each photodetector 402.

Each horizontal CCD shift register 412, 414, 416 is connected to an output structure 428, 430, 432. The horizontal CCD shift register and the output structure are positioned in a linear arrangement with respect to each other such that a path of charge transfer through the horizontal CCD shift register and output structure is an un-interrupted linear (or substantially linear) path. Each horizontal CCD shift register and associated output structure combined form an output channel 429, 431, 433. Output structures 428, 430, 432 each include a charge sensing node and an output buffer in an embodiment in accordance with the invention.

At least one of the phases in shift register element 418 receives a charge packet directly from photodetectors 402. In the illustrated embodiment, phase 420 in each shift register element 418 receives a charge packet directly from the photodetectors 402 using transfer mechanisms 434, 436, 438, respectively. The charge packets are then serially shifted to respective output structures. Horizontal CCD shift registers 412, 416 and output structures 428, 432, respectively, are disposed on one side of linear array 404 while horizontal CCD shift register 414 and output structure 430 are disposed on the opposite side of linear array 404. Thus, output channels 429, 431, 433 are alternately positioned on opposite sides of linear array 404. Each successive output channel, or every other output channel, is disposed on an alternate side of linear array 404. Such placement of the output channels allow the output structures 428, 430, 432 to be located directly at the end of each respective horizontal CCD shift register 412, 414, 416. This alternating arrangement allows an un-impeded transfer of charge to the output structures 428, 430, 432 because the path of charge direction is a substantially linear path. There is no spatial interference between the horizontal CCD shift registers 412, 414, 416 and output structures 428, 430, 434, thereby allowing the design of both the horizontal CCD shift registers and the output structures to be optimized for speed and signal quality.

Figure 5:
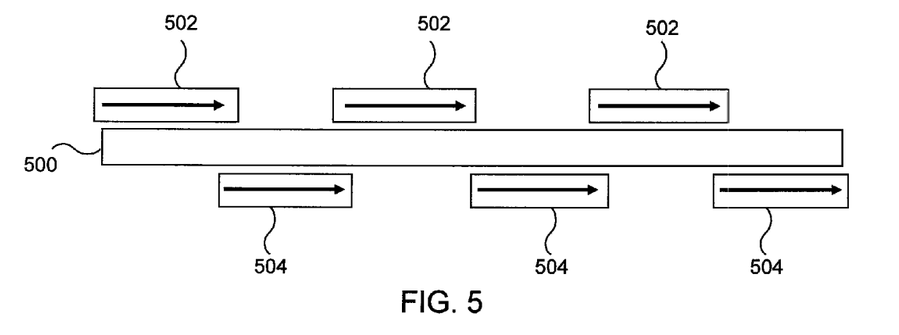
FIGS. 5-7 depict directions for shifting charge through the output channels in a linear array CCD image sensor having multiple outputs in embodiments in accordance with the invention.
Figure 6:
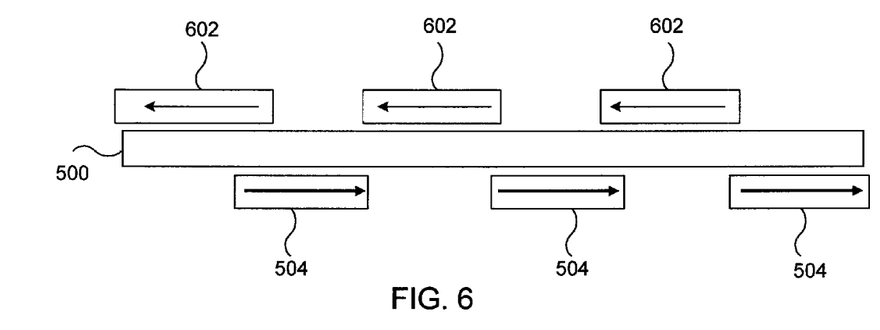
Figure 7:
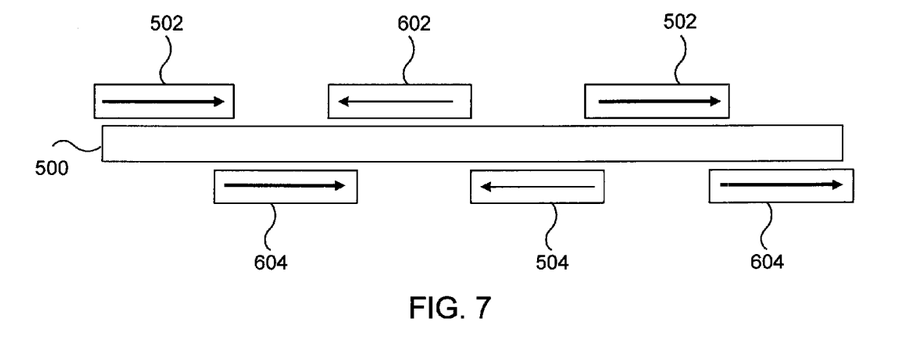

FIGS. 5-7 depict directions for shifting charge through the output channels in a linear array CCD image sensor having multiple outputs in embodiments in accordance with the invention. Each horizontal CCD shift register and output structure in an output channel may be independently oriented to shift charge to the "left" or to the "right" using techniques known in the art. In FIG. 5, output channels 502 are disposed on one side of linear array 500 and output channels 504 on the other side of linear array 500. Output channels 502, 504 each include a horizontal CCD shift register and an output structure in an embodiment in accordance with the invention. The horizontal CCD shift registers in output channels 502, 504 all shift charge in one direction (e.g., to the right).

In FIG. 6, output channels 602 are disposed on one side of linear array 500 and output channels 504 on the other side of linear array 500. Output channels 504, 602 each include a horizontal CCD shift register and an output structure in an embodiment in accordance with the invention. The horizontal CCD shift registers in output channels 602 all shift charge in one direction (e.g., to the left) while the horizontal CCD shift registers in output channels 504 all shift charge in the opposite direction (e.g., to the right).

And finally, In FIG. 7, output channels 502, 602 are disposed on one side of linear array 500 and output channels 504, 604 on the other side of linear array 500. The horizontal CCD shift registers in output channels 504, 602 all shift charge in one direction (e.g., to the left) while the horizontal CCD shift registers in output channels 502, 604 all shift charge in the opposite direction (e.g., to the right).

Other embodiments in accordance with the invention can produce a larger linear array by abutting two smaller linear arrays end-to-end where the horizontal CCD shift registers and output structures associated with the two smaller linear arrays shift charge in opposite directions. Thus, one horizontal CCD shift register can be associated with two sub-arrays of photodetectors in a linear array and an output structure is connected to both ends of the horizontal shift register. Such patterns can be aggregated into larger regular or irregular patterns.

The horizontal CCD shift registers match the pitch of the photodetectors in an embodiment in accordance with the invention. Arranging the output channels as shown in FIGS. 5-7 produces a multiple output linear image sensor that does not suffer the CTE degradation of turns or other structures. Instead, the multiple output linear arrays can have the same signal quality as a single output linear array image sensor. This improved CTE may also be used to operate at a higher line rate.

Figure 8:
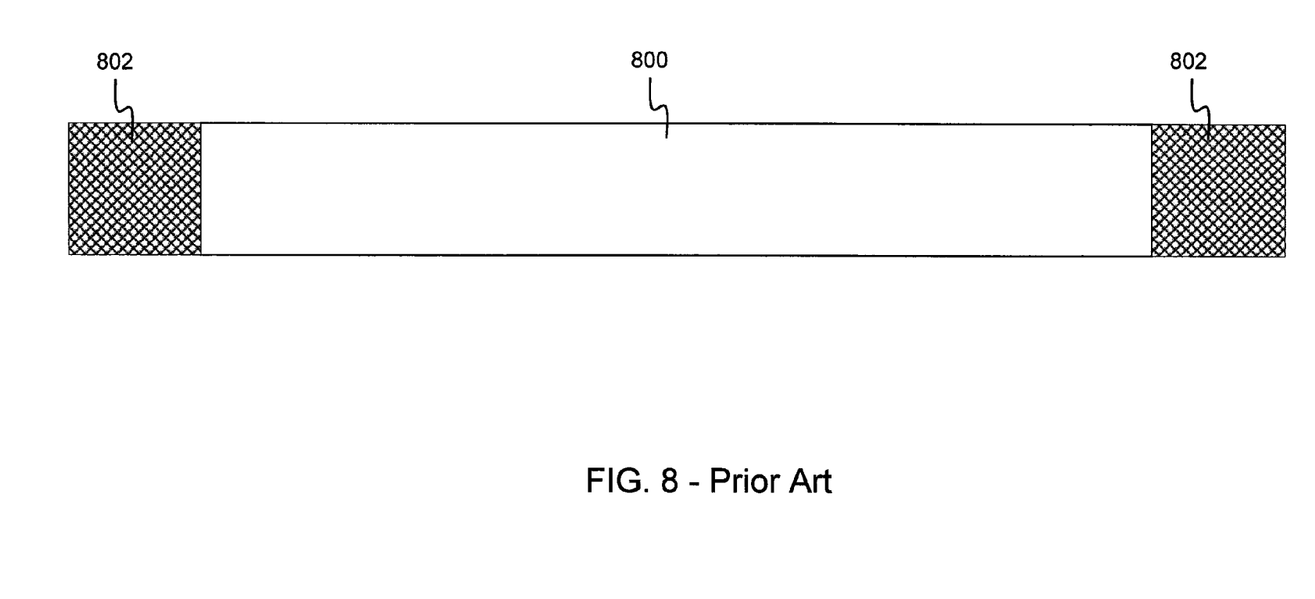
FIG. 8 illustrates a linear pixel array in accordance with the prior art.

Referring now to FIG. 8, there is shown a linear pixel array in accordance with the prior art. Linear array 800 includes multiple photo-generating photodetectors or pixels. Dark reference pixel section 802 is disposed at both ends of linear pixel array 800. Dark reference pixel sections typically include multiple dark reference pixels. Dark reference pixels typically are photosensitive pixels that are covered by an opaque shield, such as a metal shield. Dark reference pixels are not used to produce photo-generated charge carriers (i.e., charge produced by incident light). Instead, dark reference pixels are used to determine compensation values for dark charge that is produced by the pixels when not illuminated. All pixels (both dark reference and photo-generating) produce some amount of charge in non-illuminated conditions ("dark charge"). The amount of dark charge produced by each pixel can differ from other pixels due to variations in the manufacturing process. In pixels that also produce photo-generated charge, the dark charge constitutes noise that is added to the photo-generated charge. Thus, the charge produced by the photo-generating pixels can be erroneous because the charge does not accurately represent the amount of light received by a photo-generated pixel.

Signals representing the amount of dark charge output from the dark reference pixels are subtracted from the signals produced by the photo-generating pixels, thereby eliminating, or at least reducing, the amount of dark charge included in the signals produced by the photo-generating pixels. In conventional linear array image sensors, dark reference pixels 802 are placed only at the ends of the linear array 800. Dark reference pixels 802 cannot be placed within linear array 800 because the dark reference pixels do not produce photo-generated charge when an image is captured. If interspersed within linear array 800, the dark reference pixels would produce dark lines in a captured image. Dark reference pixels are therefore placed only at the ends of linear array 800.

Figure 9:
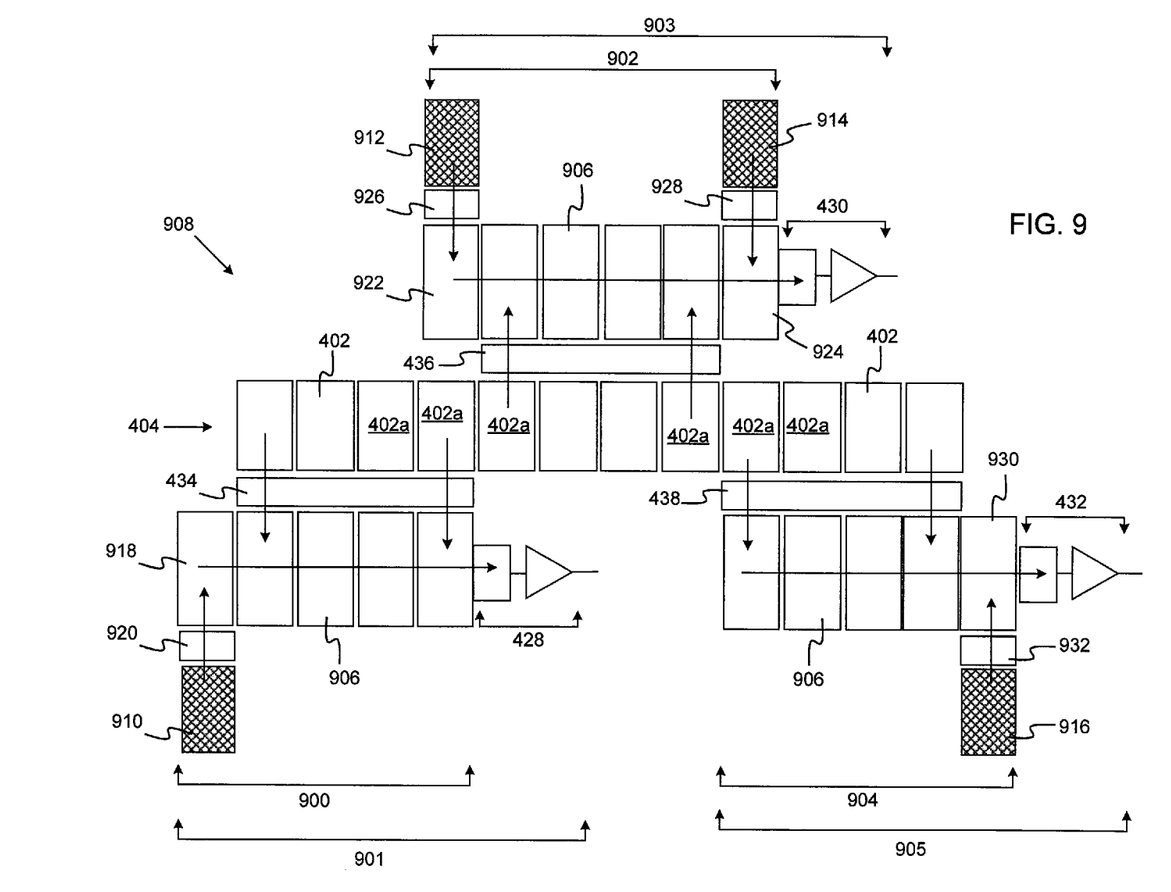
FIG. 9 depicts a simplified block diagram of a multiple output linear array CCD image sensor in a second embodiment in accordance with the invention.

FIG. 9 depicts a simplified block diagram of a multiple output linear array CCD image sensor in a second embodiment in accordance with the invention. Contiguous photodetectors 402, 402a are grouped into distinct sub-arrays, as with the embodiment illustrated in FIG. 4. Horizontal CCD shift registers 900, 902, 904 include multiple shift register elements 906 having one or more phases per photodetector. Photodetectors 402 transfer photo-generated charge to respective shift register elements 906 in horizontal CCD shift registers 900, 902, 904.

Each horizontal CCD shift register 900, 902, 904 is connected to an output structure 428, 430, 432. The horizontal CCD shift register and the output structure are positioned in a linear arrangement with respect to each other such that the path of charge transfer through the horizontal CCD shift register and the output structure is an un-interrupted linear (or substantially linear) path. Each horizontal CCD shift register and associated output structure combined form an output channel 901, 903, 905. Output channels 901 and 905 are disposed on one side of linear array 404 while output channel 903 is disposed on the opposite side of linear array 404.

Image sensor 908 includes dark reference pixels 910, 912, 914, 916. Although only four dark reference pixels are shown, those skilled in the art will appreciate that an image sensor can include any number of dark reference pixels. Dark reference pixel 910 is electrically connected to additional shift register element 918 in horizontal CCD shift register 900. Dark reference pixel 910 transfers charge to additional shift register element 918 using transfer mechanism 920.

Dark reference pixels 912, 914 are electrically connected to additional shift register elements 922, 924 in horizontal CCD shift register 902. Dark reference pixels 912, 914 transfer charge to respective additional shift register elements 922, 924 using transfer mechanisms 926, 928. And finally, dark reference pixel 916 is electrically connected to additional shift register element 930 in horizontal CCD shift register 904 and transfers charge to the additional shift register element using transfer mechanism 932. The signals output from output structures 428, 430, 432 include non-image (dark) charge produced by dark reference pixels 910, 912, 914, 916 and dark and photo-generated charge carriers output from photodetectors 402, 402a.

Shift register elements 918, 922 are positioned at one end of horizontal CCD shift registers 900, 902, the end farthest from output structures 428, 430. Shift register elements 924, 926 are positioned at the other end of horizontal CCD shift registers 902, 904, the end closest to output structures 430, 432. One advantage to the embodiment illustrated in FIG. 9 is that dark reference pixels can be placed at locations other than the ends of linear array 404. For example, in the illustrated embodiment, dark reference pixels 912, 914 are positioned near photo-generating photodetectors (e.g., photodetectors 402a) within linear array 404. This allows the dark charge produced by dark reference pixels 912, 914 to better represent the amount of dark charge produced by the photo-generating photodetectors 402a.

Figure 10:
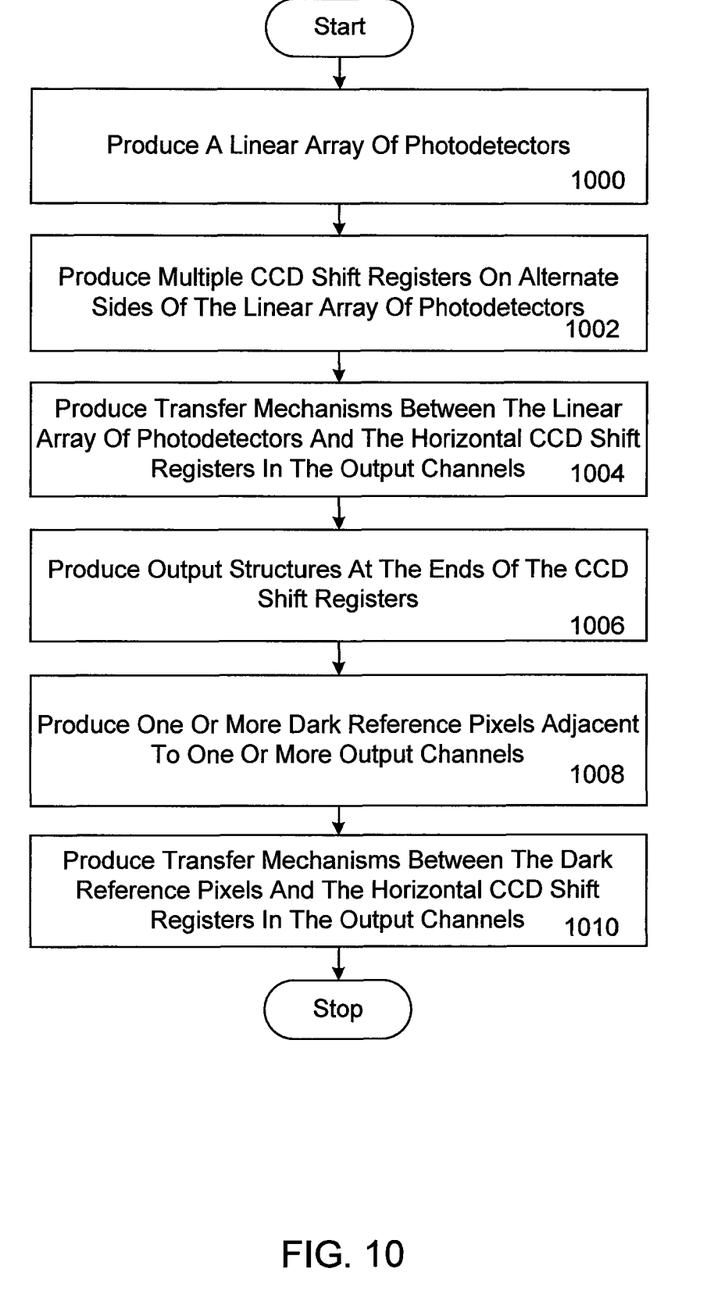
FIG. 10 is a flowchart of a method for producing linear array CCD image sensor 908 shown in FIG. 9.

Referring now to FIG. 10, there is shown a flowchart of a method for producing image sensor 908 shown in FIG. 9. Initially, a linear array of photodetectors is produced, as shown in block 1000. The linear array of photodetectors can be produced using techniques known in the art. For example, a masking layer can be deposited over a substrate and patterned to provide openings at the locations where the photodetectors will be formed. A dopant having a particular conductivity type is then implanted into the substrate to produce the photodetectors. The photodetectors can be any type of photodetector, including pinned and unpinned photodiodes.

Next, as shown in block 1002, multiple horizontal CCD shift registers are produced on one side of the linear array. Multiple horizontal CCD shift registers are also produced on the opposite side of the linear array. The horizontal CCD shift registers are produced such that each successive output channel is disposed on an alternate side of the linear array.

The horizontal CCD shift registers can be produced using techniques known in the art. For example, a masking layer can be deposited over the substrate and patterned to provide openings at the locations where each shift register element, or phase in each shift register element, will be formed. A dopant having a particular conductivity type is then implanted into the substrate to produce the shift register element or phase. Barrier implants may also be formed between shift register elements or phases. Also, electrodes are produced over each shift register element or phase and electrically connected to respective voltage clocking signals that are used to shift charge packets through the horizontal CCD shift registers. Typically, the electrodes are formed in electrode layers. In a two phase CCD shift register, alternating electrodes (every other electrode) form one electrode layer and the remaining electrodes a second electrode layer. In a four phase CCD shift register, electrodes disposed over the first and third phase (or the second and fourth phase) form one electrode layer and the remaining electrodes a second electrode layer.

Next, as shown in block 1004, the transfer mechanisms between the linear array and the horizontal CCD shift registers are produced. The transfer mechanisms can be produced using techniques known in the art. The output structures are then produced at the end or ends of the horizontal CCD shift registers (block 1006). For example, the output structures can be produced by depositing a series of masking layers over the substrate and patterning the masking layers to provide openings at the locations where the charge sensing nodes and the components of the output buffer will be formed. Dopants having particular conductivity types are then implanted into the substrate to produce the charge sensing nodes and output buffers.

One or more dark reference pixels are produced adjacent to the horizontal CCD shift registers in one or more output channels, as shown in block 1008. The dark reference pixel or pixels are formed on the side of the horizontal CCD shift register that is opposite the side immediately adjacent to the linear array. The dark reference pixels can be produced when the linear array of photodetectors are formed. An opaque shield is then formed over the dark reference pixels using techniques known in the art.

If dark reference pixels are produced, an additional shift register element is included in respective horizontal CCD shift registers for each dark reference pixel associated with that horizontal CCD shift register. The additional shift register elements can be formed when the horizontal CCD shift registers are produced at blocks 1002 and 1004.

And finally, as shown in block 1010, the transfer mechanisms between the dark reference pixels and the horizontal CCD shift registers in the output structures are produced. The transfer mechanisms can be produced simultaneously with the transfer mechanisms between the linear array and the horizontal CCD shift registers.

Those skilled in the art will recognize that other embodiments in accordance with the invention can modify the order of the blocks shown in FIG. 10. For example, the transfer mechanisms can be produced before the output structures, or the linear array can be formed after the transfer mechanisms are formed. Multiple components included in the linear array, horizontal shift registers, transfer mechanisms, output structures, or dark reference pixels can be produced at the same time by patterning the masking layers appropriately. Additionally, other components in an image sensor can be produced in between the processes shown in FIG. 10. And finally, some of the blocks can be omitted in other embodiments in accordance with the invention. By way of example only, blocks 1008 and 1010 can be omitted.

The invention has been described in detail with particular reference to certain preferred embodiments thereof, but it will be understood that variations and modifications can be effected within the spirit and scope of the invention. For example, embodiments in accordance with the invention have been described in conjunction with a four-phase horizontal CCD shift register. Other embodiments in accordance with the invention can include one or more phases. The output structures can include additional or different components than the charge sensing node and output buffer described herein.

And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST 100 linear array CCD image sensor
102 photodetector
104 linear array
106 charge packet
108 shift register element
110 horizontal CCD shift register
112 transfer mechanism
114 charge sensing node
116 output buffer
200 output structure
202 sub-array of photodetectors
204 horizontal CCD shift register
300 shift register element
302 phase
304 charge transfer distance to output
306 charge transfer distance between phases
400 linear array CCD image sensor
402 photodetector
402a photodetector
404 linear array of photodetectors
406 sub-array of photodetectors
408 sub-array of photodetectors
410 sub-array of photodetectors
412 horizontal CCD shift register
414 horizontal CCD shift register
416 horizontal CCD shift register
418 shift register element
420 phase
422 phase
424 phase
426 phase
428 output structure
429 output channel
430 output structure
431 output channel
432 output structure
433 output channel
434 transfer mechanism
436 transfer mechanism
438 transfer mechanism
500 linear array
502 output channel
504 output channel
602 output channel
604 output channel
800 linear array
802 dark reference pixels
900 horizontal CCD shift register
901 output channel
902 horizontal CCD shift register
903 output channel
904 horizontal CCD shift register
905 output channel
906 shift register element
908 linear array CCD image sensor
910 dark reference pixel
912 dark reference pixel
914 dark reference pixel
916 dark reference pixel 918 shift register element
920 transfer mechanism
922 shift register element
924 shift register element
926 transfer mechanism
928 transfer mechanism
930 shift register element
932 transfer mechanism

What is claimed is:

1. A method for producing multiple outputs for a linear array image sensor, the method comprising:

providing a first plurality of output channels on one side of a linear array of photodetectors, wherein the output channels in the first plurality of output channels are each connected to a distinct sub-array of photodetectors in the linear array of photodetectors;

providing a second plurality of output channels on another side of the linear array of photodetectors, wherein the output channels in the second plurality of output channels are each connected to a distinct sub-array of photodetectors in the linear array of photodetectors, and wherein each successive output channel in the first and second plurality of output channels is disposed on an alternate side of the linear array and each output channel in the first and second plurality of output channels includes a horizontal shift register and an output structure connected to an end of the horizontal shift register in a linear arrangement such that a path of charge transfer through the horizontal shift register and the output structure is substantially linear;

providing one or more additional shift register elements in each horizontal shift register; and providing a dark reference pixel electrically connected to each additional shift register element, each dark reference pixel being spaced from the linear array of photodetectors.

2. The method as in claim 1, further comprising providing a transfer mechanism between the horizontal shift registers and respective sub-arrays of photodetectors.

3. The CCD image sensor as in claim 2, further comprising another transfer mechanism disposed between each shift register element and respective dark reference pixel.

4. The method as in claim 1, wherein the additional shift register elements are at an end of the horizontal shift register farthest from the output structure.

5. The method as in claim 1, wherein the additional shift register elements are at an end of the horizontal shift register immediately adjacent to the output structure.

6. The CCD image sensor as in claim 1, wherein each output structure includes a charge sensing node.

7. The CCD image sensor as in claim 6, wherein each output structure further includes an output buffer connected to the charge sensing node.

8. The CCD image sensor as in claim 1, wherein the dark reference pixel and the linear array are disposed on opposite sides of the output channel.

9. The CCD image sensor as in claim 1, wherein each output channel is disposed between the linear array and the respective dark reference pixel.

* * * * *